United States Patent
Schlüter

(10) Patent No.: US 6,629,489 B2
(45) Date of Patent: Oct. 7, 2003

(54) PNEUMATIC BRAKE BOOSTER AND METHOD OF MANUFACTURING IT

(75) Inventor: Peter Schlüter, Kammerforst (DE)

(73) Assignee: Lucas Industries plc (GB)

( * ) Notice: Subject to any disclaimer, the term of this patent is extended or adjusted under 35 U.S.C. 154(b) by 0 days.

(21) Appl. No.: 10/071,330

(22) Filed: Feb. 8, 2002

(65) Prior Publication Data

US 2002/0073835 A1 Jun. 20, 2002

Related U.S. Application Data

(63) Continuation of application No. PCT/EP00/07202, filed on Jul. 29, 2000.

(30) Foreign Application Priority Data

Aug. 10, 1999 (DE) .......................................... 199 37 769

(51) Int. Cl.$^7$ ............................. F16J 3/00; B29C 45/00; B60T 8/44
(52) U.S. Cl. ...................... 92/99; 303/114.3; 264/328.1
(58) Field of Search .......................... 91/376 R; 92/99, 92/100; 303/113.3, 114.3, 114.1, 114.2; 188/356, 357; 264/328.1

(56) References Cited

U.S. PATENT DOCUMENTS

| | | | |
|---|---|---|---|
| 4,348,944 A | 9/1982 | Ochiai | 91/376 R |
| 4,567,812 A | * 2/1986 | Weiler et al. | 91/376 R |
| 4,821,623 A | 4/1989 | Shinohara | |
| 5,277,100 A | 1/1994 | Shinohara | |
| 5,590,578 A | * 1/1997 | Ikeda | 91/376 R |
| 5,732,556 A | 3/1998 | Schluter et al. | |
| 6,070,514 A | 6/2000 | Bayens et al. | |

FOREIGN PATENT DOCUMENTS

| | | |
|---|---|---|
| DE | 3007532 | 9/1981 |
| DE | 3111188 | 9/1982 |
| DE | 4408993 | 9/1995 |
| DE | 19611555 | 9/1997 |
| FR | 2687972 | 9/1993 |
| GB | 2070707 | 9/1981 |
| GB | 2095351 | 9/1982 |

* cited by examiner

Primary Examiner—Jack Lavinder
Assistant Examiner—Thomas J. Williams
(74) Attorney, Agent, or Firm—MacMillan, Sobanski & Todd, LLC

(57) ABSTRACT

A pneumatic brake booster (10) has a booster housing (12), the interior of which is subdivided by at least one movable wall (14) into a vacuum chamber (16) and a working chamber (18). Along an axis (A) a control valve (20) for controlling a pneumatic pressure difference acting upon the movable wall (14) projects into the booster housing (12). The movable wall (14) is workingly connected to the outside of a substantially cylindrical control valve housing (22), in that a collar (34) of a plate (30) associated with the movable wall (14) is deformed along its periphery at least in sections radially into the control valve housing (22). In order to simplify manufacture of the brake booster (10), in the portion (36) of the control valve housing (22) overlapped by the collar (34) of the plate (30) a plurality of recesses (40) are provided, which are spaced apart from one another in peripheral direction and into which the collar (34) of the plate (30) is radially deformed. The recesses (40) are accessible from the end of the control valve housing (22) disposed in the booster housing (12).

12 Claims, 2 Drawing Sheets

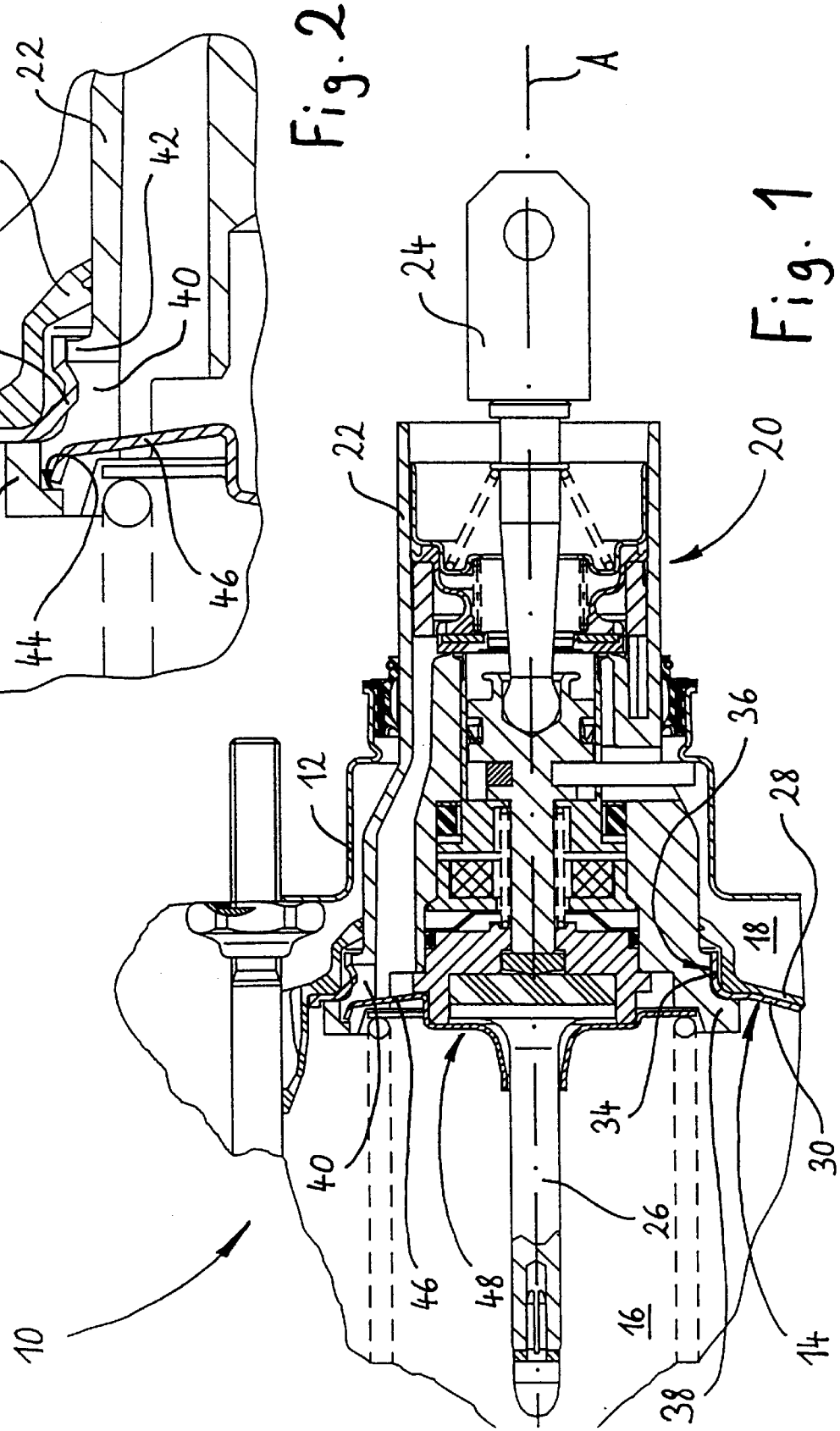

PNEUMATIC BRAKE BOOSTER AND METHOD OF MANUFACTURING IT

CROSS REFERENCE TO RELATED APPLICATIONS

This application is a continuation of International Application No. PCT/EP00/07202 filed Jul. 29, 2000, which claims priority to German Patent Application No. 19937769.3 filed Aug. 10, 1999.

BACKGROUND OF THE INVENTION

The invention relates to a pneumatic brake booster, in particular for motor vehicles.

Pneumatic brake boosters of said type are known, e.g. from DE 44 08 993 A1 and U.S. Pat. No. 5,732,556, which are incorporated by reference herein. Millions of them are fitted in motor vehicles and used to boost the pedal force, which is introduced into a vehicle brake system by a driver, and transmit it to a master cylinder in order in the latter to pressurize a hydraulic fluid. The hydraulic pressure thus generated is supplied to the vehicle brakes, where it presses friction elements against a rotating component which is to be braked, as a rule against a brake drum or brake disk.

A conventional vacuum brake booster utilizes the difference between atmospheric pressure and a vacuum generated artificially—e.g. by the intake system of an i.c. engine—for force, boosting. In the brake booster two chambers are provided for said purpose, of which the one is constantly connected to a vacuum source, while the other is connectable by means of a control valve either to atmospheric pressure or to a vacuum. The two chambers, which are mostly referred to as the working chamber and the vacuum chamber, are separated in a gasproof manner from one another by a movable wall. The movable wall is normally formed by a diaphragm of elastomeric material (e.g. rubber), which is supported by a plate-shaped component made of rigid material. For fastening the movable wall on the housing of the control valve, according to the already cited DE 44 08 993 A1 a cylindrical collar of the plate supporting the rubber diaphragm is pushed onto the control valve housing and then deformed in sections by radial caulking into an annular groove, which is provided in the control valve housing in the region overlapped by the collar. In said manner a keyed connection of the movable wall to the control valve housing is obtained. In force transmitting direction the supporting plate lies against a radial shoulder of the control valve housing, so that the force generated at the movable wall by the said pressure difference may be transmitted to the control valve housing and from the latter to a master cylinder disposed downstream of the brake booster.

Manufacture of the said annular groove of the control valve housing, into which the collar of the plate supporting the rubber diaphragm is at least in sections radially caulked, is relatively complex from the point of view of the moulds. Particularly when the control valve housing is manufactured by injection moulding, it is necessary—because of the undercuts arising as a result of the annular groove—for the injection mould to contain moulding elements which are displaceable in transverse direction, i.e. at right angles to the longitudinal direction of the control valve housing, so that after injection moulding the control valve housing may be removed from the mould.

SUMMARY OF THE INVENTION

The object of the invention is to indicate a pneumatic brake booster, the control valve housing of which is less costly to produce without having to dispense with the fastening of the movable wall to the control valve housing achieved by simple caulking of the diaphragm plate.

Proceeding from the initially cited prior art, said object is achieved according to the invention by providing in the region of the control valve housing overlapped by the collar of the plate a plurality of recesses, which are spaced apart from one another in peripheral direction and into which the collar of the plate is radially deformed, e.g. by caulking, wherein the recesses are accessible from the end of the control valve housing disposed in the booster housing. In other words, the control valve housing of the brake booster according to the invention has recesses, which extend from the end face of the control valve housing situated in the booster housing as far as into the region, which is overlapped by the collar of the plate. Radially, said recesses are positioned in such a way that the wall of the control valve housing in the region overlapped by the collar is interrupted by the recesses, i.e. in the portion of the control valve housing overlapped by the collar each recess gives rise to an opening, also referred to as a caulking window, into which the collar may be radially deformed. Preferably, the recesses extend in the control valve housing in axial direction parallel to the latter's longitudinal axis. Alternatively, the recesses may extend obliquely relative to the longitudinal axis of the control valve housing, it merely being necessary to ensure that each recess creates an opening in the region of the control valve housing overlapped by the collar.

Since according to the invention the said recesses in the control valve housing may be manufactured from one end of the latter, there is no need for the transversely displaceable elements required in prior art so that, now, a plurality of so-called mould cavities, i.e. a plurality of injection moulds for control valve housings, may be disposed alongside one another in a single moulding tool. Previously, this was not possible within an acceptable amount of space because the transversely displaceable elements took up too much room. According to the invention, therefore, with only one moulding tool and a correspondingly low spatial requirement a plurality of control valve housings may be manufactured simultaneously, thereby significantly reducing production costs.

According to a preferred development of the brake booster according to the invention, in the recesses a radially outer region of the latter at the end of the control valve housing disposed in the booster housing forms undercuts for spring arms of a retaining element, which is used for positioning a force output tappet of the brake booster. The said undercuts are accessible from the direction of the other end of the control valve housing, i.e. the end disposed outside of the booster housing, particularly in a direction parallel to the longitudinal axis of the control valve housing. This means that the undercuts may be manufactured from the other end of the control valve housing, with the result that their manufacture likewise does not require transversely displaceable elements in the manufacturing tool.

The already mentioned retaining element, which is to position the force output tappet of the brake booster on the control valve housing, comprises spring arms which are preferably designed in such a way that the retaining element is introducible into the control valve housing from the end of the latter disposed in the booster housing, wherein the spring arms then latch behind the undercuts formed by the recesses. The spring arms, as they are introduced, are therefore pressed slightly together and then spring apart from one another as soon as the retaining element has been introduced into the control valve housing far enough to enable the spring arms to snap into the region of larger diameter formed by the undercuts. It is then no longer possible to pull the retaining element out of the control valve housing because the spring arms are supported against the undercuts. The thus described retaining element with its spring arms, which latch in the control valve housing, may advantageously also be used independently of the recesses according to the invention. Suitable undercuts in the control valve housing then have to be provided in some other manner.

The present invention also provides a method of manufacturing a brake booster according to the invention, whereby the previously described recesses in the control valve housing are advantageously produced in that a plurality of first slide bars, which are spaced apart in peripheral direction, are introduced into an injection mould for the control valve housing from the end of the control valve housing, which is to be disposed in the booster housing, parallel to the longitudinal axis of the control valve housing in such a way that said first slide bars in the region of the control valve housing, which is later overlapped by the collar of the plate, take the place of the surface of the control valve housing. In other words, the first slide bars fill the injection mould for the control valve housing at some points of the portion of the control valve housing which will later be overlapped by the collar of the plate, so that no material may flow up to said points. The control valve housing is then injection moulded and the first slide bars, after adequate cooling of the injected material, are withdrawn from the injection mould. The openings required for radial caulking of the collar may be produced in said manner extremely easily and without transversely displaceable elements taking up space. In the method according to the invention, all of the first slide bars are preferably manipulated, i.e. introduced and withdrawn, jointly, e.g. by fastening all of the first slide bars to a common holder.

According to a preferred development of the manufacturing method according to the invention, before the control valve housing is injection-moulded, in the opposite direction to each first slide bar a second slide bar, which is disposed radially outside of the first slide bar, is slid along the associated first slide bar and introduced into the injection mould to such an extent that between its free end and the end of the control valve housing to be disposed in the booster housing a defined gap remains. During the subsequent injection moulding said defined gap is filled by the injected material, with the result that an undercut is produced in the recesses, which are formed by the first slide bars and enlarged by the second slide bars. Said undercut also may therefore be produced without transversely displaceable elements on the moulding tool and hence in an extremely space-saving manner.

In the method according to the invention, the first and/or the second slide bars may be flat or curved in the shape of a cylinder segment. When the slide bars are flat, their thickness and radial positioning dictate how far the openings, which arise in the lateral surface of the control valve housing, extend in peripheral direction. When the slide bars are curved in the shape of a cylinder segment, their curvature corresponds to that of the control valve housing so that the thickness of the slide bars has no influence upon the extension of the resulting openings in peripheral direction.

Since the radial extension of the undercuts for the spring arms of the said retaining element does not have to be great, the second slide bars, the thickness of which determines the radial extension of the undercuts, are preferably thinner than the first slide bars.

There now follows a detailed description of a preferred embodiment of a brake booster according to the invention with reference to the accompanying, diagrammatic drawings. Said drawings show:

BRIEF DESCRIPTION OF THE DRAWINGS

FIG. 1 a longitudinal section through the, in the context of the present invention, relevant part of a brake booster according to the invention, FIG. 2 an enlarged view of a detail from FIG. 1, and FIG. 3 a likewise enlarged view similar to FIG. 2 illustrating the manufacturing method according to the invention.

DETAILED DESCRIPTION OF THE INVENTION

Figure 3:
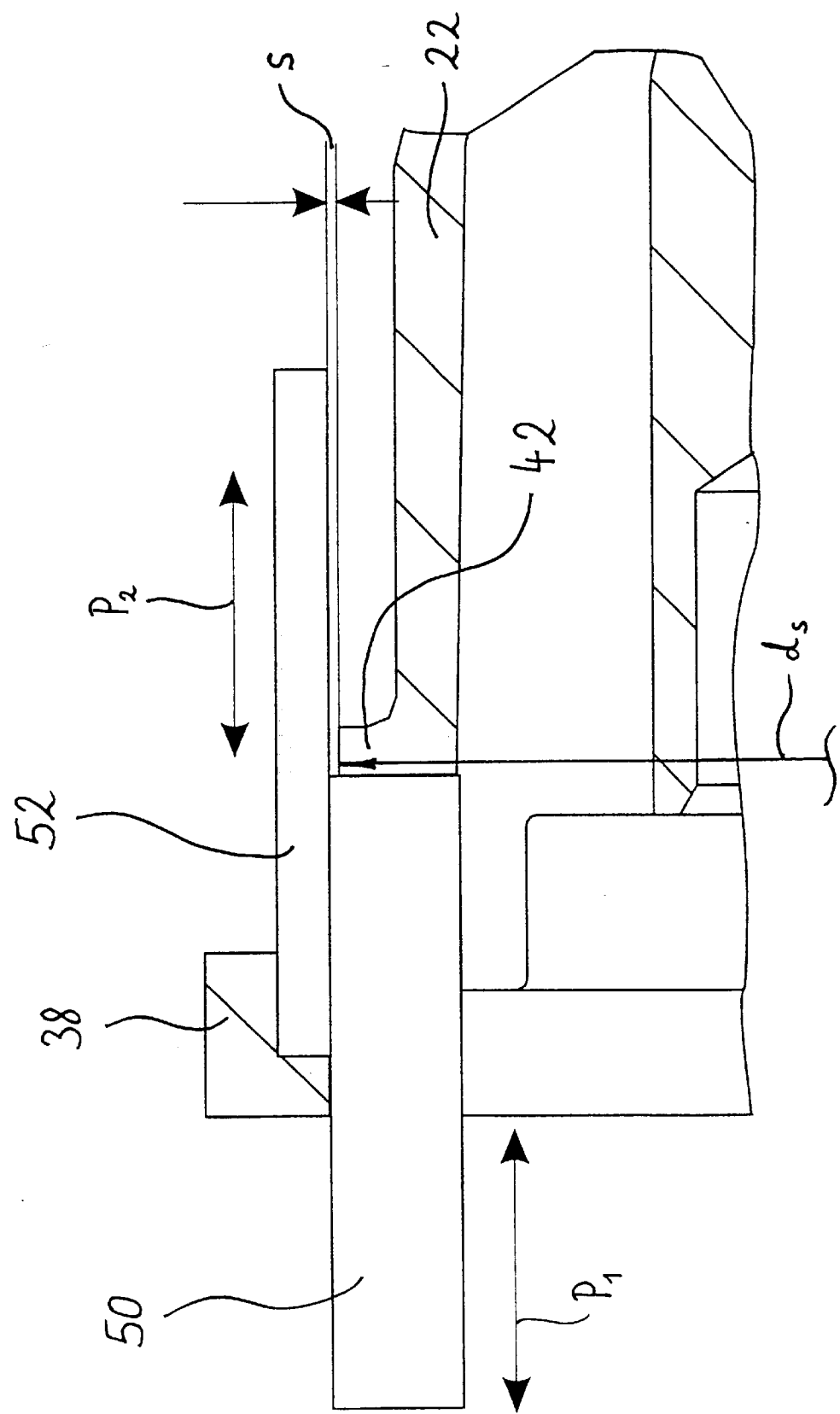

In FIG. 1 a part of a vacuum brake booster, which is generally denoted by 10, is shown in longitudinal section. The brake booster 10 in a conventional manner has a shell-shaped housing 12, the interior of which is subdivided by a movable wall 14 into a vacuum chamber 16 and a working chamber 18.

During operation of the brake booster 10 the vacuum chamber 16 is in constant communication with a vacuum source, e.g. with the intake tract of an internal combustion engine or with a vacuum pump. By means of a control valve 20 with a housing 22 a connection may be established either of the working chamber 18 to the vacuum chamber 16 or of the working chamber 18 to the ambient atmosphere in order, on the one hand, to be able to evacuate the working chamber 18 and, on the other hand, to be able to allow ambient pressure to flow into the evacuated working chamber 18. The movable wall 14 is workingly connected to the control valve housing 22, more details about which will be provided below.

The brake booster 10 is actuated by means of a rod-shaped input element 24, which is spring-biased into its starting position and projects into the control valve housing 22 along an axis A, which is simultaneously the central longitudinal axis of the control valve housing 22. Introducing atmospheric pressure into the evacuated working chamber 18 gives rise at the movable wall 14 to a pressure difference, which—multiplied by the effective area of the movable wall 14—results in a force, which is transmitted from the movable wall 14 to the control valve housing 22 and from the latter to a force output tappet 26. The force output tappet 26 in turn transmits the force to a master cylinder, which is not shown here and is disposed functionally downstream of the brake booster 10, of a vehicle hydraulic brake system. The structural design and function of such a brake booster 10 are well known to experts in the present field and therefore require no further explanation.

The movable wall 14 usually comprises a diaphragm 28 of rubber-elastic material, which is supported by a plate 30 of rigid material, which is mostly made from sheet metal. At its radially outer edge the rubber-elastic diaphragm 28 is clamped sealingly (not shown here) between two shell-shaped components of the booster housing 12. The radially inner edge of the diaphragm 28 is formed by a circumferential sealing lip 32, which seals the movable wall 14 relative to the control valve housing 22.

For fastening the movable wall 14 on the control valve housing 22, the plate 30 is provided radially at the inside with a hollow-cylindrical collar 34, which is slipped onto the control valve housing 22 until it comes to lie against a portion 36 of the control valve housing 22, the outside diameter of which portion substantially corresponds to the inside diameter of the collar 34. The portion 36 accordingly forms a guide diameter $d_s$ for receiving and positioning the plate 30. In the said position the plate 30 lies against a radially outwardly projecting shoulder 38 of the control valve housing 22 so that the force, which is exerted in the event of a pressure difference by the movable wall 14, may be effectively transmitted to the control valve housing 22.

In order to achieve a keyed connection between the movable wall 14 and the control valve housing 22, the collar 34, after having been brought into the previously described position, is deformed by a caulking process radially into recesses 40 (see in particular FIG. 2). A plurality of said recesses 40, of which only one is shown in the drawings, are arranged distributed over the periphery of the control valve housing 22 in the portion 36, which is overlapped by the collar 34 of the plate 30. Each recess 40 extends axially from the end of the control valve housing 22 disposed in the booster housing 12 parallel to the axis A as far as into the portion 36 of the control valve housing 22, without however fully penetrating the portion 36. In said manner there remains in the region of the recesses 40 a web 42, against which the part of the collar 34 deformed radially into the appropriate recess 40 may be supported. Each recess 40 therefore produces in the lateral surface of the portion 36 of the control valve housing 22 a caulking window, which extends axially and in peripheral direction. At least two such caulking windows should be provided for a secure fit of the movable wall 14 on the control valve housing 22, although it is better when three or four caulking windows are provided.

In the illustrated embodiment the recesses 40 additionally have in each case an undercut 44. Said undercuts 44, which are accessible from the direction of the end of the control valve housing 22 disposed outside of the booster housing 12 along an axis parallel to the axis A, serve as abutments for the free ends of spring arms 46 of a retaining element 48, which positions the force output tappet 26 on the control valve 20. To put it more precisely, the retaining element 48 holds the force output tappet 26 coaxially with the axis A in order by said means to facilitate the subsequent introduction of the spherical end of the force output tappet 26 into the master cylinder, which is not shown here. During introduction of the retaining element 48, which may be manufactured e.g. as a punching from a spring steel, the spring arms 46, of which only one is shown in the drawings, are pressed together in the direction of the axis A so that the free end of each spring arm 46 may slide through under the material projection of the control valve housing 22 formed by each undercut 44. A spring arm 46, as soon as it moves into the region of the recess 40 enlarged by the undercut 44, springs back into the position shown in FIGS. 1 and 2, with the result that its free end springs behind the undercut 44. As illustrated, the free end of each spring arm 46 is bent at an angle towards the undercut 44 so that the spring arms 46 in a barb-like manner hold a retaining element 48, which has been introduced into the control valve housing 22, securely in the control valve housing 22.

FIG. 3 shows how the recesses 40 and undercuts 44 may be manufactured easily by means of two axial slide bars 50 and 52. A first slide bar 50, which is axially movable according to the double arrow $P_1$, is inserted from the end of the control valve housing 22 to be disposed in the booster housing 12 into the injection mould for manufacturing the control valve housing 22 parallel to the axis A far enough into the portion 36 of the control valve housing 22 to allow formation of the web 42. In radial direction the first slide bar 50 in said case has to be positioned in such a way that its radially outer surface comes to lie a defined dimension s outside of the guide diameter $d_s$ formed by the portion 36. Only then is it ensured that the desired caulking window is formed in the portion 36. The first slide bar 50 may have a flat shape. The peripheral extension of the caulking window then depends upon the dimension s, which is the maximum amount by which the first slide bar 50 projects radially beyond the portion 36. The greater the maximum projection of the slide bar 50 in radial direction, the further the caulking window formed by the first slide bar 50 extends in peripheral direction.

The first slide bar 50 may however alternatively have the shape of a cylinder segment, wherein the cylindrical curvature of the slide bar 50 corresponds to the cylindrical curvature of the portion 36 of the control valve housing 22. The size, in peripheral direction, of a caulking window formed by such a cylinder segment-shaped slide bar 50 then depends merely upon the extension of the slide bar 50 in peripheral direction, while the dimension s is not crucial in said respect. It merely has to be ensured that the slide bar 50 projects radially slightly beyond the portion 36.

To form the undercut 44, a second axial slide bar 52 is introduced in the opposite direction into the injection mould, i.e. from the end of the control valve housing 22 which is to be disposed outside of the booster housing 12. The second slide bar 52 is also, as indicated by the double arrow $P_2$, moved parallel to the axis A in such a way that it slides along the first slide bar 50. So that the undercut 44 may be formed, the second slide bar 52 should be introduced not right up to the end of the control valve housing 22 which is to be disposed in the booster housing 12.

After the first slide bars 50 and the second slide bars 52 have been positioned in the manner shown in FIG. 3, the injection moulding process may be effected and the desired recesses 40 with caulking windows and undercuts 44 are formed. After the injection moulding process the slide bars 50 and 52 are withdrawn axially from the injection mould and the control valve housing 22 produced may be removed from the mould without difficulty. Since transversely displaceable elements are not required, a plurality of so-called mould cavities for control valve housings 22 may be disposed alongside one another on an injection moulding tool, thereby reducing the cost of manufacture.

The slide bars 50 and 52 are preferably of an identical shape, i.e. when the first slide bars 50 have a flat shape, the second slide bars 52 are also flat. It is however also possible for a first slide bar 50 in the shape of a cylinder segment to be combined with a flat second slide bar 52 because the undercut 44 in peripheral direction does not have to extend over the entire length of the recess 40.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Pneumatic brake booster, in particular for motor vehicles, having a booster housing, the interior of which is subdivided by at least one movable wall into a vacuum chamber and a working chamber, and having a control valve for controlling a pneumatic pressure difference acting upon the movable wall, which control valve projects along an axis into the booster housing and comprises a substantially cylindrical control valve housing, to the outside of which the movable wall is workingly connected in that a collar of a plate associated with the movable wall is deformed along its periphery at least in sections radially into the control valve housing, wherein in a portion of the control valve housing overlapped by the collar of the plate a plurality of recesses are provided, which are spaced apart from one another in peripheral direction and into which the collar of the plate is radially deformed, and that the recesses are accessible from the end of the control valve housing disposed in the booster housing, and that the recesses at the end of the control valve housing disposed in the booster housing form radial undercuts for spring arms of a retaining element, which is used to position a force output tappet of the brake booster, and that said undercuts are accessible from the direction of the end of the control valve housing disposed outside of the booster housing.

2. Brake booster according to claim 1, wherein the collar is caulked along its periphery at least in sections radially into the control valve housing.

3. Brake booster according to claim 1, wherein the spring arms of the retaining element for positioning the force output tappet of the brake booster are designed in such a way that the retaining element is introducible into the control valve housing from the end of the latter disposed in the booster housing, wherein the spring arms latch behind the undercuts.

4. Brake booster according to claim 1, wherein the recesses are accessible from the end of the control valve housing deposed in the booster housing along a direction parallel to the axis.

5. Brake booster according to claim 1, wherein the undercuts are accessible from the direction of the end of the control valve housing disposed outside of the booster housing along a direction parallel to the axis.

6. Method of manufacturing a pneumatic brake booster, in particular for motor vehicles, wherein the brake booster comprises a booster housing, the interior of which is subdivided by at least one movable wall into a vacuum chamber and a working chamber, and a control valve, which projects along an axis into the booster housing, for controlling a pneumatic pressure difference acting upon the movable wall by means of a substantially cylindrical control valve housing, to the outside of which the movable wall is workingly connected, in that a collar of a plate associated with the movable wall is deformed along its periphery at least in sections radially into the control valve housing, wherein introduction of a plurality of first slide bars, which are spaced apart from one another in peripheral direction, into an injection mould for the control valve housing from the end of the control valve housing, which is to be disposed in the booster housing, parallel to the axis in such a way that the first slide bars in a portion of the control valve housing subsequently overlapped by the collar of the plate take the place of the surface of the control valve housing, injection moulding of the control valve housing, and removal of the first slide bars from the injection mould.

7. Method according to claim 6, wherein all of the first slide bars are manipulated jointly.

8. Method according to claim 6, wherein at least one of the first and second slide bars are flat.

9. Method according to claim 6, wherein at least one of the first and second slide bars are curved in the shape of a cylinder segment.

10. Method according to claim 6, wherein, before the control valve housing is injection-moulded, in the opposite direction to each first slide bar a second slide bar, which is disposed radially outside of the first slide bar, is slid along the associated first slide bar and introduced into the injection mould for the control valve housing to such an extent that between its free end and the end of the control valve housing to be disposed in the booster housing a defined gap remains.

11. Method according to claim 10, wherein the second slide bars are thinner than the first slide bars.

12. Method according to claim 6, wherein the collar is caulked along its periphery at least in sections radially into the control valve housing.

* * * * *

UNITED STATES PATENT AND TRADEMARK OFFICE
CERTIFICATE OF CORRECTION

PATENT NO. : 6,629,489 B2
DATED : October 7, 2003
INVENTOR(S) : Peter Schluter

It is certified that error appears in the above-identified patent and that said Letters Patent is hereby corrected as shown below:

<u>Title page,</u>
Item [63], Related U.S. Application Data, delete "Jul. 29, 2000" and insert
-- Jul. 26, 2000 --.

Signed and Sealed this

Twentieth Day of January, 2004

JON W. DUDAS
*Acting Director of the United States Patent and Trademark Office*